(12) United States Patent
Li et al.

(10) Patent No.: US 8,943,312 B2
(45) Date of Patent: Jan. 27, 2015

(54) METHOD OF AND SYSTEM FOR AUTHENTICATING ONLINE READ DIGITAL CONTENT

(71) Applicants: Peking University Founder Group Co., Ltd., Beijing (CN); Beijing Founder Apabi Technology Ltd., Beijing (CN)

(72) Inventors: Xiaolei Li, Beijing (CN); Wei Wan, Beijing (CN); Chao Qu, Beijing (CN); Chao Lei, Beijing (CN)

(73) Assignees: Peking University Founder Group Co., Ltd., Beijing (CN); Beijing Founder Apabi Technology Ltd., Beijing (CN)

( * ) Notice: Subject to any disclaimer, the term of this patent is extended or adjusted under 35 U.S.C. 154(b) by 72 days.

(21) Appl. No.: 13/894,138

(22) Filed: May 14, 2013

(65) Prior Publication Data

US 2013/0254534 A1 Sep. 26, 2013

Related U.S. Application Data

(63) Continuation of application No. PCT/CN2012/086147, filed on Dec. 7, 2012.

(30) Foreign Application Priority Data

Dec. 9, 2011 (CN) .......................... 2011 1 0409347

(51) Int. Cl.
*G06F 21/00* (2013.01)
*G06F 21/33* (2013.01)
*G06F 21/10* (2013.01)

(52) U.S. Cl.
CPC ................ *G06F 21/33* (2013.01); *G06F 21/00* (2013.01); *G06F 21/10* (2013.01); *G06F 21/335* (2013.01); *G06F 2221/0711* (2013.01)
USPC .............................. 713/156; 726/10; 726/27

(58) Field of Classification Search
USPC ........................................... 713/156; 726/10
See application file for complete search history.

(56) References Cited

U.S. PATENT DOCUMENTS

2003/0007640 A1* 1/2003 Harada et al. ................. 380/270
2008/0083040 A1* 4/2008 Dani et al. ...................... 726/28

\* cited by examiner

*Primary Examiner* — Yogesh Paliwal
(74) *Attorney, Agent, or Firm* — Finnegan, Henderson, Farabow, Garrett & Dunner, LLP

(57) ABSTRACT

A method of authenticating an online read right of a digital content includes: receiving an online read first request from a terminal, the first request including first user information, obtaining first right information corresponding to the first user information, generating a first right model, obtaining first certificate information corresponding to the first right model, generating a second request including the first right model and the first certificate information, and authenticating the first certificate information and M function rights in the first right model.

10 Claims, 3 Drawing Sheets

METHOD OF AND SYSTEM FOR AUTHENTICATING ONLINE READ DIGITAL CONTENT

CROSS REFERENCE TO RELATED APPLICATION(S)

This application is a continuation of International Application No. PCT/CN2012/086147, filed on Dec. 7, 2012, which claims the benefit of Chinese Patent Application No. 201110409347.8, filed with the Chinese Patent Office on Dec. 9, 2011, and entitled "Method of and System for Authenticating Online Read Digital Content," both of which are hereby incorporated by reference in their entirety.

FIELD OF THE INVENTION

The present invention relates to the field of processing computer information and particularly to a method of and system for authenticating reading a digital content online.

BACKGROUND OF THE INVENTION

More and more documents are published in digital form and on Internet. People have become more interested in reading the digital contents online. The competition for online publishing is also increasingly intensive. To protect copyrights of the digital contents, controlling the read right is particularly important for distributing the digital contents.

Some digital content products may provide an online read function capable of performing right control on the digital contents for the purpose of copyright protection. There are two conventional implementations:

A first one is an autonomous control implementation. The implementation may use a managing function to maintain the rights of the digital contents and to provide a corresponding read range by referring to the rights of a digital content when a user requests read the digital content online.

A second one is an interface control implementation. This implementation may be separated from the digital contents and the right management. The implementation provides only an online read function. When a user requests reading the digital contents online, the system that stores the digital content may request an authority for a right for the user and provide the digital contents according to the right to the user.

In the autonomous control implementation, a single service system manages the digital contents, performs the reading function, and other service functions on the service system. The reading function is not separated from other service functions of the service system. Thus, the autonomous control implementation cannot provide a service to general users as an independent reading tool.

In the interface control implementation, frequent communication with the authority is required, thus resulting in a performance drawback. Also, a corresponding interface has to be developed for a third party to access the digital contents online, thus resulting in an increased cost.

SUMMARY OF THE INVENTION

The present disclosure provides a method and system for authenticating an online read right of a digital content so as to address the problems in the prior art.

According to some embodiments, a method of authenticating an online read right of a digital content includes receiving a first online read request from a terminal, the first online read request including first user information, obtaining first right information corresponding to the first user information according to stored correspondence relationships between right information and user information, and generating a first right model according to the first right information, the first right model including M function rights, wherein M is greater than or equal to 1, obtaining first certificate information corresponding to the first right model according to stored correspondence relationships between certificate information and right models, generating a second request including the first right model and the first certificate information, and transmitting the second request to an online reading module.

According to some other embodiments, the method may further include authenticating, by the online reading module, the first certificate information and the M function rights in the first right model.

The first right model may include one or more of a right on a reading range, an online concurrence right, a service time right, a copy right and a print right, and a validity period corresponding to each of the function rights.

The present disclosure also provides a system for authenticating an online read right of a digital content. The system for authenticating an online read right of a digital content includes a service processing system configured to receive a first online read request from a terminal, the first online read request including first user information, obtain first right information corresponding to the first user information according to stored correspondence relationships between right information and user information, generate a first right model according to the first right information, the first right model including M function rights, wherein M is greater than or equal to 1, obtain first certificate information corresponding to the first right model according to stored correspondence relationships between certificate information and right models, generate a second request including the first right model and the first certificate information, and transmit the second request to an online reading system. The system for authenticating an online read right of a digital content may further include the online reading system configured to receive the second request, and authenticate the first certificate information and the M function rights in the first right model.

The online reading system may include a receiving module configured to receive the second request, an obtaining module configured to obtain the first right model and the first certificate information in the second request, a certificate authenticating module configured to authenticate the first certificate information, a right model authenticating module configured to authenticate the M function rights in the right model according to a result of authenticating the first right information, and a content providing module configured to provide the terminal with online read contents corresponding to authenticated function rights among the M function rights.

DETAILED DESCRIPTION OF THE EMBODIMENTS

The present disclosure provides a method and system for authenticating online reading of a digital content. According to some embodiments, when a user needs to read the digital content online, the user can transmit a request to a service processing system. The service processing system obtains user information and generates and transmits a corresponding right model and certificate to an online read system. The online read system provides the user with functions according to the right model and the certificate. The embodiment thus addresses the performance problem of frequent signal interaction between a reading system and an authorization system, and provides convenience in digital content management while ensuring the security of the digital contents.

The embodiments of the present disclosure will be detailed below with reference to the drawings.

Figure 1:
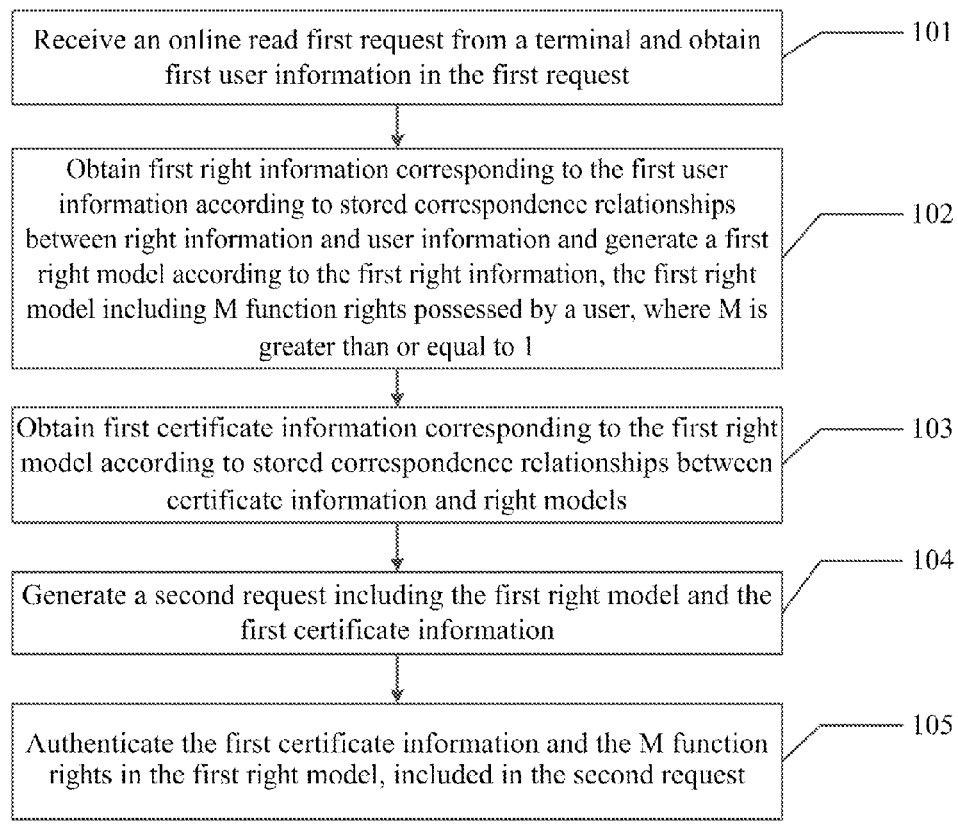
FIG. 1 is a flow chart of a method of authenticating online reading of a digital content according to some embodiments of the present disclosure.

FIG. 1 depicts a flow chart of a method of authenticating reading a digital content online. As shown in FIG. 1, the method may include the following steps:

step 101: a service processing system, for example, a system for authenticating reading a digital content online, receives a first request for reading the digital content online from a terminal and obtains first user information in the first request.

step 102: the system obtains first right information corresponding to the first user information according to a pre-stored correspondence relationship between right information and user information. The system generates a first right model according to the first right information. The first right model may include rights on various functions, such as M functions, where M is an integer greater than or equal to 1.

The correspondence relationship between right information and user information can be pre-stored in the service processing system. After the service processing system obtains the first user information, the service processing system will refer to the pre-stored correspondence relationships to obtain the first right information corresponding to the first user information. The first right information includes information on the user's rights on functions. For example, the first right information defines the functions that the user may have rights on.

After the first right information is obtained, the service processing system generates the first right model according to the definition of one or more functions. The first right model may include M functions that the user may be entitled to.

As an example, the M functions may include a reading right with a certain range, an online concurrence right, a right on service time, a right on copying, and a right on printing. The functions that a user is entitled to can be added or deleted in the service processing system as needed for the user.

Furthermore, in order to prevent any of the M functions from being used infinitely by the user, a corresponding period of validity of the rights may be set for each of the M functions.

step 103: the system obtains first certificate information corresponding to the first right model according to a pre-stored correspondence relationship between certificate information and right models.

The correspondence relationship between certificate information and a right model is stored in the service processing system. The service processing system, after the first right model is generated, may obtain the first right model and generate unique first certificate information correspondingly according to the first right model.

A certificate may be associated with a specific period of time. After that period of time, the rights authorized by the certificate may expire. The service processing system may obtain the time period information corresponding to the certificate after the certificate in the first certificate information is obtained. Thus, the system can prevent the same certificate information from being used infinitively and also protect the copyright of the digital contents.

step 104: the system generates a second request including the first right model and the first certificate information and transmits the second request to an online read system.

In some embodiments, after step 102 and step 103, the service processing system may obtain the first right information corresponding to the first user information and the first certificate information corresponding to the first right information. Then, the service processing system adds the first right model and the first certificate information into Uniform Resource Locator (URL) parameters and generates the second request including the first right model and the first certificate information.

Figure 2:
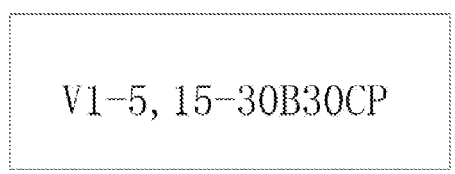
FIG. 2 is a schematic diagram of a first right model according to some embodiments of the present disclosure.

The first right model can be transmitted through the URL parameters. The first right model can be followed by a right range. The definition of the right range can be extended as needed in practice. FIG. 2 shows an exemplary right model. As illustrated in FIG. 2, V represents a read right, and 1-5 and 15-30 subsequent thereto indicate that the user can turn to the pages 1 to 5 and the pages 15 to 30 for their contents; and other rights can be defined with an extension as needed in practice.

step 105: the online read system authenticates the first certificate information and the M functions in the first right model, included in the second request.

For example, upon reception of the second request, the online read system authenticates the first certificate information in the second request and then authenticates the M functions in the first right model.

Figure 3:
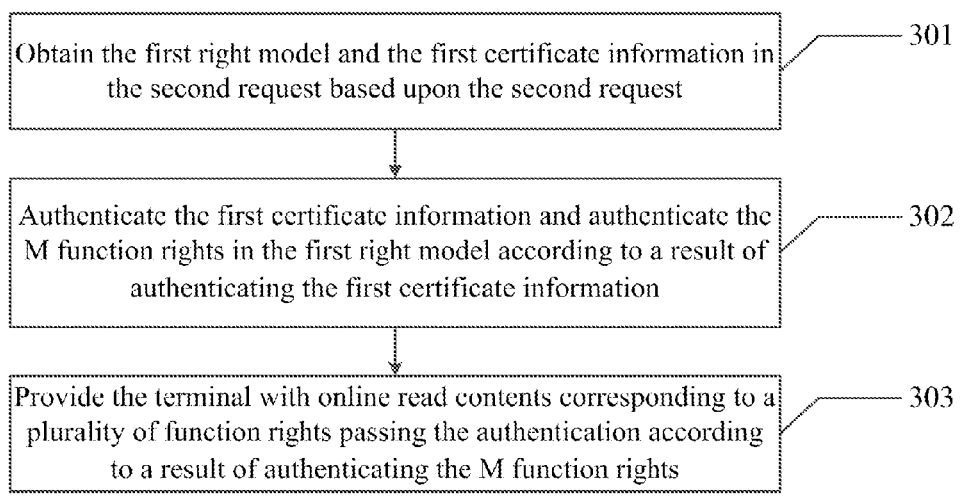
FIG. 3 is a flow chart of authenticating a first right model and first certificate information in a second request in an online read system according to some embodiments of the present disclosure.

FIG. 3 depicts a flow chart of authenticating the first right model and the first certificate information in the second request by the online read system. The method may include:

step 301: the online read system may obtain the first right model and the first certificate information in the second request.

For example, upon reception of the second request, the online read system obtains the first right model in the second request and the validity time periods corresponding to the M functions in the first right model and also obtains the first certificate information and the time period of validity corresponding to the first certificate.

step 302: the online read system authenticates the first certificate information and the M functions in the first right model according to a result of authenticating the first certificate information.

For example, the online read system may authenticate the first certificate information including a unique certificate and a period of validity corresponding to the certificate, and also authenticate the certificate for legality. If the certificate is legal, the period of validity of the certificate is authenticated; or if the certificate is illegal, the second request is rejected.

Particularly if the user modifies the contents in the right model without being permitted, the certificate is considered as illegal, and the second request is rejected.

After the certificate is authenticated for legality, the period of validity of the certificate is authenticated by obtaining and comparing the period of validity of the first certificate with a current time of the use of the certificate by the user, and if the period of validity of the certificate extends to a time later than the current time, then the certificate passes the authentication, and the first right model is parsed; otherwise, the second request is rejected.

The online read system authenticates the first right model after both the legality of the certificate in the first certificate information and the period of validity corresponding to the certificate pass the authentication.

The online read system obtains the M rights of functions in the first right model and the period of validity corresponding to each of the M rights of functions and obtains the current time of the reception of the second request and compares the period of validity of each of the M rights of functions with the current time.

step 303: the online read system provides the terminal with digital contents for reading online corresponding to a plurality of rights of functions passing the authentication according to a result of authenticating the M rights of functions.

If L rights of functions among the M rights of functions have periods of validity extending to times later than the current time, then the terminal is provided with online read contents corresponding to the L rights of functions, and the user can access directly a service corresponding to the L rights of functions on the terminal, thus avoiding frequently transmitting requests and frequent information interactions. L is an integer greater than or equal to 0 and smaller than or equal to M.

Figure 4:
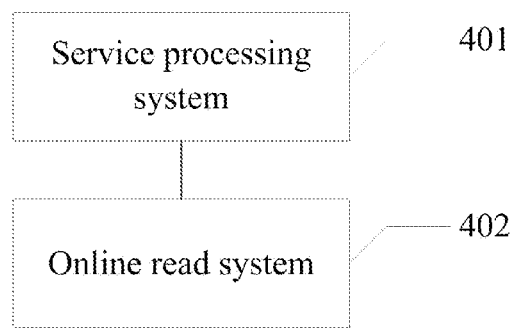
FIG. 4 is a system for authenticating online reading of a digital content according to some embodiments of the present disclosure.

FIG. 4 depicts a system for authenticating a digital content for reading online. The system may include a service processing system 401, and an online read system 402. The service processing system 401 may be configured to receive a first request for reading a digital content online from a terminal, obtain first user information in the first request, obtain first right information corresponding to the first user information according to a pre-stored correspondence relationship between right information and user information, generate a first right model according to the first right information. The first right model includes M rights of functions that a user is entitled to, where M is greater than or equal to 1. The system may be further configured to obtain first certificate information corresponding to the first right model according to a correspondence relationship between certificate information and right models, and generate a second request including the first right model and the first certificate information.

The online read system 402 may be connected with the service processing system 401 and is configured to receive the second request. The online read system 402 authenticates the first certificate information and the M rights of functions in the first right model, included in the second request.

Figure 5:
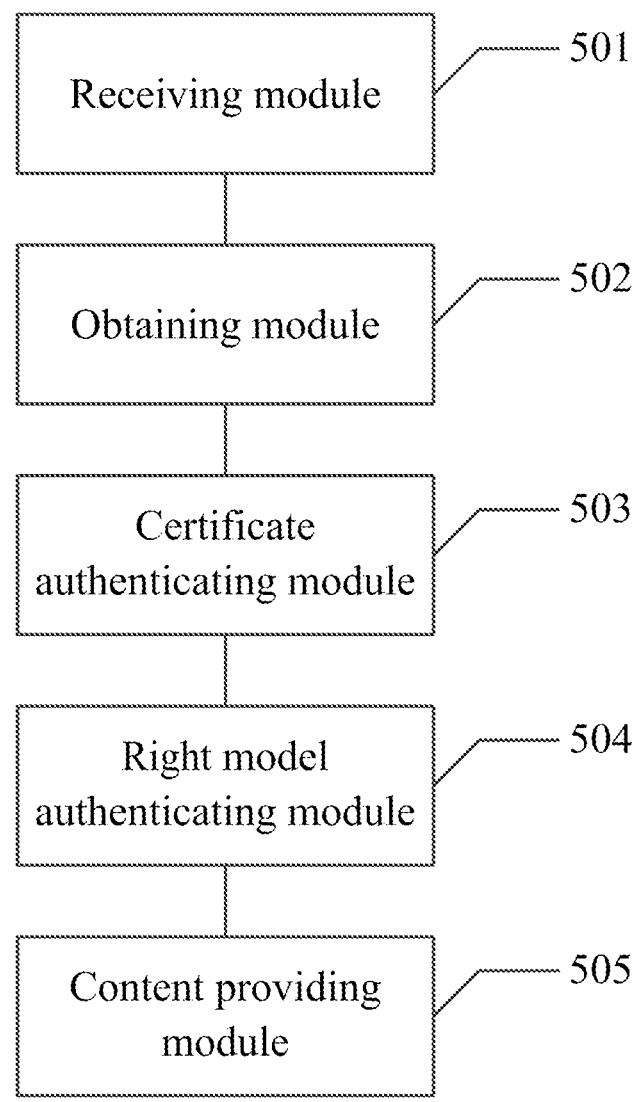
FIG. 5 is a schematic structural diagram of an online read system according to some embodiments of the present disclosure.

FIG. 5 depicts a schematic structural diagram of the online read system. The online read system may include a receiving model 501 configured to receive the second request, an obtaining module 502 configured to obtain the first right model and the first certificate information in the second request, a certificate authenticating module 503 configured to authenticate the first certificate information, a right model authenticating module 504 configured to authenticate the M rights of functions in the right model according to a result of authenticating the first right information, and a content providing module 505 configured to provide the terminal with online read contents corresponding to a plurality of function rights passing the authentication according to a result of authenticating the M rights of functions.

The certificate authenticating module 503 may include a certificate period of validity obtaining unit configured to obtain a period of validity in the first certificate information, a certificate period of validity authenticating unit configured to compare the period of validity of the first certificate information with the current time, and if the current time is within the period of validity of the certificate, to have the certificate pass the authentication; otherwise, to reject the second request.

Furthermore the right model authenticating module authenticating the M function rights in the right model may include obtaining the M function rights in the first right model and a period of validity corresponding to each function right, and comparing the periods of validity of L function rights among the M function rights with the current time.

The invention provides a method of authenticating an online read digital content, which includes: receiving an online read first request from a terminal, obtaining first user information in the first request, obtaining first right information corresponding to the first user information, generating a first right model according to the first right information, obtaining first certificate information corresponding to the first right model according to stored correspondence relationships between certificate information and right models, generating a second request including the first right model and the first certificate information, and authenticating the first certificate information and M function rights in the first right model included in the second request, thereby addressing the performance problems of systems arising from frequent signal interactions between the systems and enabling convenient digital content management while ensuring the security of digital contents to prevent illegal pirating and to protect copyrights of the digital contents.

Those skilled in the art shall appreciate that the embodiments of the invention can be embodied as a method, a system, or a computer program product encoded into a computer readable medium. Therefore, the invention can be embodied in the form of a hardware embodiment, a software embodiment, or an embodiment of software and hardware in combination. Furthermore, the invention can be embodied in the form of a computer program product implemented in one or more computer useable storage media (including but not limited to a disk memory, CD-ROM, an optical memory, etc.) in which computer useable program codes are contained.

The invention has been described in a flow chart and/or a block diagram of the method, the device (system), and/or the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of authenticating an online read right of a digital content, comprising:
   receiving a first online read request from a terminal, the first online read request including first user information;
   obtaining first right information corresponding to the first user information according to stored correspondence relationships between right information and user information, and generating a first right model according to the first right information, the first right model including M function rights, wherein M is greater than or equal to 1;
   obtaining first certificate information corresponding to the first right model according to stored correspondence relationships between certificate information and right models;
   generating a second request including the first right model and the first certificate information; and
   transmitting the second request to an online reading module.

2. The method according to claim 1, wherein the method further comprising: authenticating, by the online reading module, the first certificate information and the M function rights in the first right model.

3. The method according to claim 2, wherein the authenticating the first certificate information and the M function rights in the first right model, comprises:
   obtaining, by the online reading module, the first right model and the first certificate information in the second request;
   authenticating, by the online reading module, the first certificate information and authenticating the M function rights according to a result of authenticating the first certificate information; and
   providing, by the online reading module, the terminal with online read contents corresponding to authenticated function rights among the M function rights.

4. The method according to claim 3, wherein the first certificate information includes information on a validity period of a first certificate, and wherein the authenticating the first certificate information comprises:
   comparing the validity period of the first certificate with a current time, and if the validity period of the first certificate extends beyond the current time, determining that the first certificate is authenticated; otherwise, rejecting the second request.

5. The method according to claim 1, further comprising parsing the first right model, which comprises:
   obtaining the M function rights in the first right model and a validity period corresponding to each function right; and
   comparing the validity period of each of the M function rights with a current time, and if L function rights among the M function rights have validity periods extending beyond the current time, providing the terminal with online read contents corresponding to the L function rights, wherein L is an integer greater than or equal to 0 and smaller than or equal to M.

6. The method according to claim 1, wherein the M function rights comprise one or more of a read range right, a service time right, a copy right, and a print right, and a corresponding validity period for each of the function rights.

7. A system for authenticating an online read right of a digital content, comprising:
   a service processing system configured to:
      receive a first online read request from a terminal, the first online read request including first user information,
      obtain first right information corresponding to the first user information according to stored correspondence relationships between right information and user information,
      generate a first right model according to the first right information, the first right model including M function rights, wherein M is greater than or equal to 1,
      obtain first certificate information corresponding to the first right model according to stored correspondence relationships between certificate information and right models, and
      generate a second request including the first right model and the first certificate information, and
      transmit the second request to an online reading system; and
   the online reading system configured to receive the second request, and authenticate the first certificate information and the M function rights in the first right model.

8. The system according to claim 7, wherein the online reading system comprises:
   a receiving module configured to receive the second request;
   an obtaining module configured to obtain the first right model and the first certificate information in the second request;
   a certificate authenticating module configured to authenticate the first certificate information;
   a right model authenticating module configured to authenticate the M function rights in the right model according to a result of authenticating the first right information; and
   a content providing module configured to provide the terminal with online read contents corresponding to authenticated function rights among the M function rights.

9. The system according to claim 8, wherein the certificate authenticating module is configured to obtain a validity period in the first certificate information, and compare the validity period of the first certificate information with a current time, and if the current time is within the validity period, to determine that the first certificate information is authenticated; otherwise, to reject the second request.

10. The system according to claim 8, wherein a right model authenticating module is configured to obtain the M function rights in the first right model and a validity period corresponding to each function right, and compare the validity periods with the current time.

* * * * *